Feb. 13, 1951  F. H. SLAYMAKER ET AL  2,541,944
DIAPHRAGM MOUNTING
Filed June 13, 1946   2 Sheets-Sheet 1

INVENTORS
WILLARD F. MEEKER
BY LYNN L. MERRILL
FRANK H. SLAYMAKER
J. L. Bower
ATTORNEY Feb. 13, 1951     F. H. SLAYMAKER ET AL     2,541,944

DIAPHRAGM MOUNTING

Filed June 13, 1946     2 Sheets-Sheet 2

*INVENTORS*
WILLARD F. MEEKER
LYNN L. MERRILL
FRANK H. SLAYMAKER

BY *J. L. Bowes*

ATTORNEY

Patented Feb. 13, 1951

2,541,944

UNITED STATES PATENT OFFICE 2,541,944

DIAPHRAGM MOUNTING

Frank H. Slaymaker, Willard F. Meeker, and Lynn L. Merrill, Rochester, N. Y., assignors to Stromberg-Carlson Company, a corporation of New York Application June 13, 1946, Serial No. 676,425

11 Claims. (Cl. 181—31)

This invention relates to transducers and more particularly to transducers having directional characteristics.

In many situations in which it is not possible to determine the location of an object visually, it is desirable to provide signals which will serve to locate such objects. For example, it may be desirable to provide an audible signal which varies in a characteristic such as pitch, whenever the observer, such as a blind person carrying the apparatus, approaches an object or whenever an object moves with respect to the observer, as the case may be.

In a co-pending United States application of Willard F. Meeker and Frank H. Slaymaker, Serial No. 607,840, filed July 30, 1945, now Patent No. 2,474,918, issued July 5, 1949, and assigned to the same assignee as the present invention, there is described and claimed a pulsed frequency modulation system for ascertaining the location of unseen objects. In this system, there is employed a single oscillator for generating continuous oscillations varying cyclically as to frequency within a given band of frequencies. Oscillations within only a part of this band are radiated periodically and echos reflected from various objects are received and combined with the continuous oscillations to produce a beat note which varies in character with the distance to the object. The beat note is translated into sound, the pitch varying with the distance to the object.

It is an object of this invention to provide a transducer suitable for use in a locating or ranging system such as that briefly described above, for example, and which has a desired directional characteristic.

In carrying out the objects of the invention there is employed a reflector having a suitable disk-like diaphragm and the diaphragm is so dimensioned and is driven in such a manner that substantially all of the radiation from the diaphragm is directed toward the side walls of the reflector, and symmetrically with respect to the axis of the reflector. As a result, a sufficiently directive beam of radiation is obtained.

Figure 1:
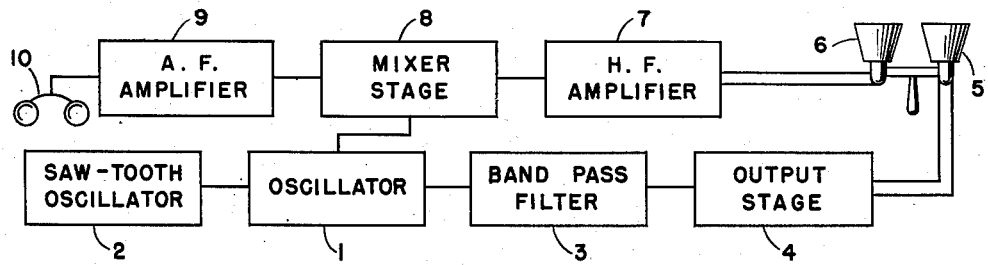
Figure 2:
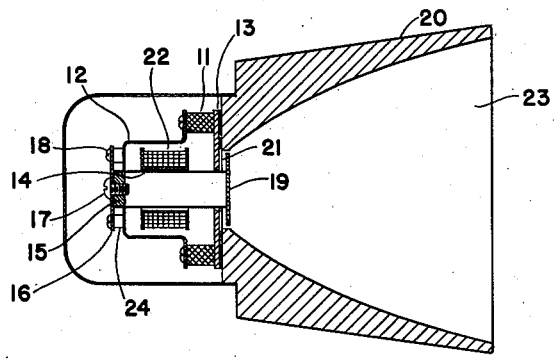
Figure 3:
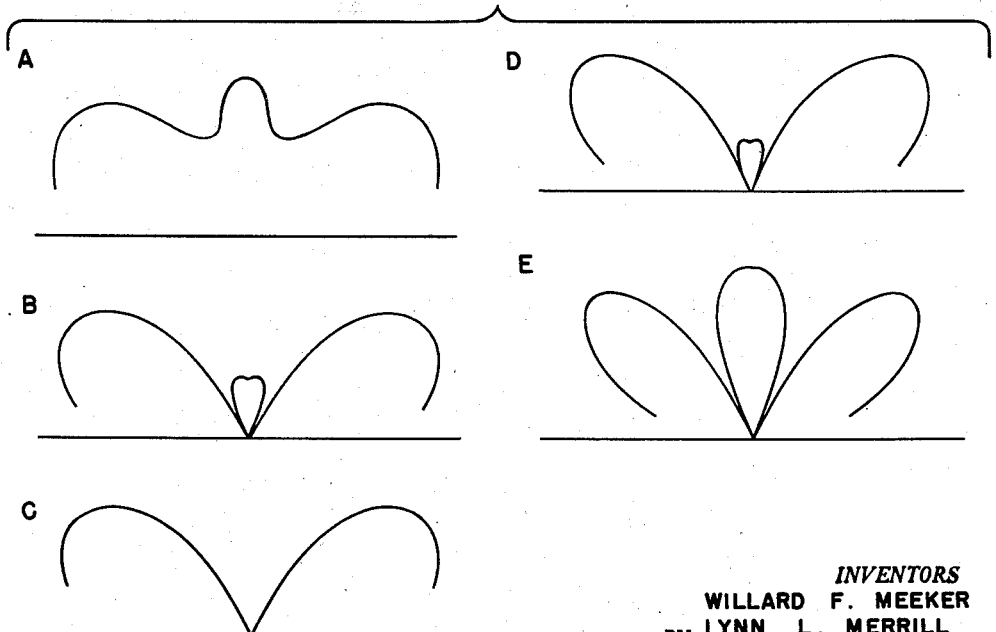
Figure 9:
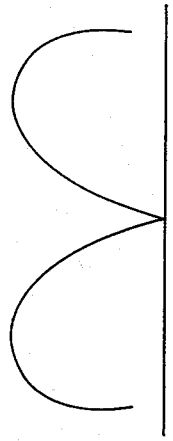
Figure 10:
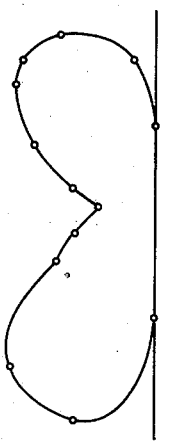
Figure 11:
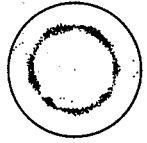
Figure 7:
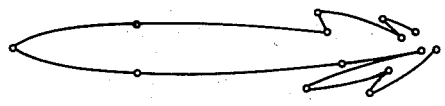
Figure 8:
Figure 5:
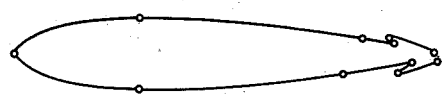
Figure 6:
Figure 4:
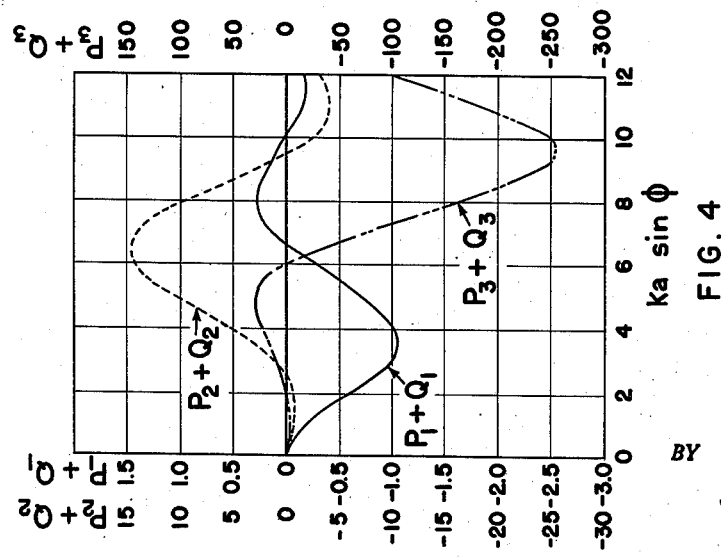

Other objects and advantages of this invention will be understood from a reading of the following specification in conjunction with the accompanying drawings in which Fig. 1 is a block diagram illustrating a suitable form of ranging or locating system, Fig. 2 is a sectional view of a transducer built in accordance with the principles of this invention, Fig. 3 is a series of polar graphs showing calculated pressure distribution patterns of a typical disk-like vibrator under different conditions, Fig. 4 is a set of curves helpful in understanding and practicing the principles of this invention, Fig. 5 is a graph showing the pressure distribution which corresponds to the beam of radiation of a typical application of this invention, Fig. 6 is a representation of a carbon granule or sand pattern showing the mode of vibration of the disk used to obtain the directional or pressure characteristics of Fig. 5, Fig. 7 is a graph showing the directional pattern or pressure distribution of a diaphragm operating at a non-normal mode, Fig. 8 is a sand pattern of a non-normal single circular mode of vibration corresponding to the distribution pattern of Fig. 7, Fig. 9 is a calculated pressure distribution graph of one embodiment of our invention, Fig. 10 is a measured pressure distribution graph using the disk for which the graph of Fig. 9 was calculated, and Fig. 11 is a sand or carbon granule pattern illustrating the mode of vibration of the transducer disk utilized in connection with Figs. 9 and 10.

Referring to Fig. 1 of the drawings, there is illustrated in block form the system described and claimed in detail in the aforementioned application. There is provided a suitable oscillator 1, which may be of the resistance-capacitance or phase-shift type, for example. The frequency of oscillation may be varied in suitable manner as by means of a sawtooth oscillator 2. In order to limit the extent of the radiated frequencies, there is provided a suitable band-pass filter 3. The filtered output is passed through an output stage 4 to a directional radiator 5 from which radiations are emitted. Reflections or echoes from objects against which the radiation impinges are picked up by a receiver or microphone 6 which may be identical to the radiator 5, amplified by a suitable high frequency amplifier 7 and combined in the mixer stage 8 with oscillations derived from oscillator 1 to develop a beat note which may be amplified in an audio frequency amplifier 9 and translated into sound signals in sound reproducing means, such as headphones 10.

The radiator unit, as well as the microphone or receiver unit, are preferably of a resonant magnetostrictive type. Referring to Fig. 2, a transducer embodying the principles of our invention comprises a driving unit made up of a suitable polarizing magnet 11 mounted between a generally U-shaped polepiece 12 and an apertured polepiece 13. A hollow cylindrical tube 14, made from a material having magnetostrictive characteristics, such as nickel, is fixed against motion at one end thereof as by means of a suitable plug 15 secured in one end of the tube 14, a mounting plate 16 secured to the plug 15 by means of a suitable threaded fastening member 17 and additional threaded members 18 extending through suitable openings in the member 16 into threaded engagement with the adjacent portion of the polepiece 12. Suitable spacers 24 may be employed if necessary. The free end of the tube 14 extends axially through the opening in the polepiece 13 and has a disk-like diaphragm 19 secured thereto as by means of solder. The transducer unit also comprises suitable means for causing pressure waves resulting from the vibration of the diaphragm 19 to be directed outwardly in a beam of desired configuration. We prefer a parabolic horn or reflector 20 of suitable material, such as wood or spun aluminum, for example. The reflector has an opening 21 in its restricted end to receive the diaphragm or disk. The driver unit and the reflector may be joined together in any suitable manner (not shown). Preferably, the horn and driver unit are separated by suitable vibration insulating material in order to prevent mechanical coupling between the horn or reflector and the driver unit. The length of the tube 14 and the construction of the reflector are such that the diaphragm 19 is located approximately in the plane of the latus rectum of the reflector 20 normal to the axis thereof. The signals appearing in the output of the output stage 4 are impressed across a suitable driving coil 22 which in the illustrated form of this invention encircles the tube 14. Any suitable mounting means may be provided for the coil 22. The permanent magnets 11 serve as polarizing magnets and maintain a magnetic field through the tube 14. Whenever the flow of current through coil 22 varies in accordance with the frequency changes of the oscillator 1, the magnetic field at the tube is varied and because of the magnetostrictive properties of the tube 14, the length thereof changes. Inasmuch as the left hand end of the tube (as viewed in Fig. 2) is relatively fixed against movement, any resulting movement takes place at the diaphragm end of the tube. As a result of the foregoing, vibrations are set up in the diaphragm 19 and pressure waves are emitted therefrom.

In order to enable the operator of the device to distinguish among objects, it is preferable to limit the reflections or response to a relatively few objects and hence it is desired to provide a radiator which will emit radiation in a relatively sharp or small cross-section beam of radiation. The choice of dimensions of the diaphragm are important in achieving the desired beam. Diaphragms of the type illustrated in the drawings are caused to vibrate in modes which can be readily observed by operating the unit with the diaphragm 19 in the horizontal position and with the free face upward. If fine sand or carbon granules are then sprinkled over the face of the diaphragm, the particles will be driven from those portions of the diaphragm which are in motion and collect along nodal lines. The vibration pattern of an object such as diaphragm 19 or the way in which it vibrates is known as the "mode" of vibration. Normal modes of vibration are the simple forms of vibration corresponding to harmonics in the Fourier series. As the driving frequency applied to the object such as diaphragm 19 is varied, different conditions of resonance result. If the diaphragm or object is driven at a resonant frequency, a normal mode of vibration results. At other frequencies, complex modes of vibration are obtained and such complex modes are combinations of normal modes. Thus a "normal" mode is obtained at that frequency at which the object continues to vibrate after excitation is removed. With respect to a round, flat disc, the normal modes are circular at the resonant frequencies, and if more than one nodal circle is obtained, the circles are concentric. At other than resonant frequencies, radial or diametrical or more complex modes result.

There follows a mathematical analysis of the problems involved in properly constructing and driving or exciting the diaphragm 19 and associated parts in order to obtain the desired radiation pattern. This analysis is based on a transducer as described above except that the diaphragm is located in the plane of a substantially infinite baffle instead of in the plane of the latus rectum of the reflector. A high degree of correlation has been found between results predicted as a result of this mathematical analysis and experimental results obtained when the reflector is used.

In this analysis the following assumptions will be made:

(a) That the diaphragm 19 can be treated as a free edge disk,
(b) That even though other modes of vibration can exist only circular modes need be considered, a circular mode of vibration being any mode of vibration whose amplitude and phase are independent of angle around the diaphragm,
(c) That the driving force on the disk 19 can be considered as concentrated at a circle concentric with the circumference of the disk and having the same diameter as the driving tube 14,
(d) That the joint between the nickel tube and the disk does not appreciably alter the dynamic curve of the disk (the dynamic curve corresponding to the cross-sectional shape of the diaphragm at its maximum deformation under vibration),
(e) That the amplitude of motion is small, and
(f) That damping, due either to friction or to acoustical radiation, can be neglected.

The C. G. S. system is used except where otherwise noted.

The following symbols will be used:

$a$=radius of the disk or diaphragm 19, in cm.
$r, \theta$=polar coordinates locating any point on the disk 19,
$r_0$=radius at which the driving force is applied,
$R_1$=distance from a differential area $dA$ on the disk to a point P far removed from the disk,
$R_0$=distance from the center of the disk to the point P,
$\phi$=angle between a normal to the disk and the line $R_0$,
$W$=deflection normal to the plane of the disk,
$m$=mass per unit area of the disk,
$F(r) = F_0(r) \sin \omega t$,
$F_0(r)$=maximum applied force per unit area of the disk, $$D = \frac{Eh^3}{12(1-\nu^2)}$$

$E$=Young's modulus for elasticity for the disk material ($10^{12}$ for brass).
$\nu$=Poisson's ratio for the disk material (⅓ for brass).

$h$ = disk thickness in cm.,
$h''$ = disk thickness in inches,
$V_0$ = normal velocity
$\rho_0$ = density of air,
$\rho$ = density of the disk material (8.4 for brass),
$p$ = pressure,
$t$ = time
$f$ = frequency of vibration,
$c$ = velocity of sound in air $(34.4(10)^3$ cm./sec.),
$\omega = 2\pi f$,
$k = \omega/c$ The differential equation of the vibrating disk 19, with slight changes in notation, has been shown to be (see Electromechanical Transducers and Wave Filters by W. P. Mason, D. Van Nostrand Co., New York, N. Y., 1942, page 168, and an article by A. G. Warren, Philosophical Magazine, vol. 9, page 881, 1930).

$$\frac{\delta^4 W}{\delta r^4} + \frac{2}{r}\frac{\delta^3 W}{\delta r^3} - \frac{1}{r^2}\frac{\delta^2 W}{\delta r^2} + \frac{1}{r^3}\frac{\delta W}{\delta r} = -\frac{m}{D}\frac{\delta^2 W}{\delta t^2} + \frac{F(r)}{D} \quad (1)$$

The solution of (1) for the free vibrations of a free-edge disk may be found by assuming the driving force $F(r) = 0$ and using the method of separation of variables. Thus, let $$W = R(r) T(t) \quad (2)$$

and substitute in (1). Then $$\frac{1}{R}\left[\frac{d^4 R}{dr^4} + \frac{2}{r}\frac{d^3 R}{dr^3} - \frac{1}{r^2}\frac{d^2 R}{dr^2} + \frac{1}{r^3}\frac{dR}{dr}\right] = -\frac{m}{D}\frac{d^2 T}{dt^2}\frac{1}{T} \quad (3)$$

Let each member of (3) be set equal to C (treated as a constant) and solve. Then, using the usual notation for Bessel functions, $$R = C_1 J_0(\lambda r) + C_2 Y_0(\lambda r) + C_3 I_0(\lambda r) + C_4 k_0(\lambda r) \quad (4)$$

and, $$T = C_5 \sin\sqrt{\frac{D}{m}}\lambda^2 t + C_6 \cos\sqrt{\frac{D}{m}}\lambda^2 t \quad (5)$$

The boundary conditions to be satisfied are:

(a) The displacement is nowhere infinite,
(b) The shear is nowhere infinite
(c) The shear at $r = a$ is zero,
(d) The radial stress at $r = a$ is zero.

The shearing stress per unit of arc at any radius $r$ becomes $$\lambda^3 D[C_1 J_1(\lambda r) + C_2 Y_1(\lambda r) + C_3 I_1(\lambda r) - C_4 k_1(\lambda r)] \quad (6)$$

Since the shear at $r = 0$ is not infinite $$C_2 = C_4 = 0 \quad (7)$$

and, since shear at $r = a$ is zero, $$C_1 J_1(\lambda a) + C_3 I_1(\lambda a) = 0 \quad (8)$$

or $$C_1 = \frac{-C_3 I_1(\lambda a)}{J_1(\lambda a)}$$

In order that the radial stress at $r = a$ shall be zero it is necessary that $$\left(\frac{1-\nu}{\lambda a}\right)[C_1 J_1(\lambda a) - C_3 I_1(\lambda a)] = C_1 J_0(\lambda a) - C_3 I_0(\lambda a) \quad (9)$$

Taking $\nu = \frac{1}{3}$ and make use of (8), $$\frac{4}{3\lambda a} = \frac{J_0(\lambda a)}{J_1(\lambda a)} + \frac{I_0(\lambda a)}{I_1(\lambda a)} \quad (10)$$

Solving Eq. 10 by methods of approximation gives the values of $\lambda$, for one, two, and three nodal circles, as $$\lambda = \frac{3.01}{a}, \frac{6.21}{a}, \frac{9.37}{a}, \ldots \quad (11)$$

respectively.

Then, from (7), (8) and (4), R takes the form $$R = C_3\left[-\frac{I_1(\lambda a)}{J_1(\lambda a)}J_0(\lambda r) + I_0(\lambda r)\right] \quad (12)$$

where $\lambda$ may take on only the values given by (11).

Replace $C_3 C_5$ by $C_n$ and $C_3 C_6$ by $C'_n$. Let the successive values of $\lambda$ be $\lambda_1, \lambda_2, \lambda_3, \ldots \lambda_n$, and let $$\phi(\lambda_n r) = -\left[\frac{I_1(\lambda_n a)}{J_1(\lambda_n a)}\right]J_0(\lambda_n r) + I_0(\lambda_n r) \quad (13)$$

Then, taking the solution of (1) as a summation of terms of the form RT, it follows that $$W = \sum_{n=1}^{\infty}\Phi(\lambda_n r)\left[C_n \sin\sqrt{\frac{D}{m}}\lambda_n^2 t + C'_n \cos\sqrt{\frac{D}{m}}\lambda_n^2 t\right] \quad (14)$$

Eq. 14 is the general expression for the free vibrations of the disk 19. With a given set of initial conditions the values of $C_n$ and $C'_n$ may be found by familiar methods.

For the forced vibrations assume a harmonic driving force of the form $$F(r) = F_0(r) \sin \omega t \quad (15)$$

Substitute (15) in (1) and observe that the resulting equation may be satisfied by a solution of the form $$W = f(r) \sin \omega t \quad (16)$$

where $f(r)$ represents the dynamic deformation curve of the disk 19. Since losses are considered negligible, there is no component of the velocity in phase with the driving force, and the displacement and the driving force may be considered in phase. Substituting (15) and (16) in (1) and removing the time factor, $$\frac{d^4 f}{dr^4} + \frac{2}{r}\frac{d^3 f}{dr^3} - \frac{1}{r^2}\frac{d^2 f}{dr^2} + \frac{1}{r^3}\frac{df}{dr} - \frac{m}{D}\omega^2 f = \frac{F_0(r)}{D} \quad (17)$$

Now it may be shown that $$\int_0^a \Phi(\lambda_n r) r\, dr = 0$$

$$\int_0^a \Phi(\lambda_n r)\Phi(\lambda_m r) r\, dr = 0 \text{ if } m \neq n =$$

$$-a^2\left[\frac{4}{9\lambda_n^2 a^2} + \frac{J_0(\lambda_n a) I_0(\lambda_n a)}{J_1(\lambda_n a) I_1(\lambda_n a)}\right]I_1^2(\lambda_n a) \text{ if } m = n \quad (18)$$

Equations 18 make it possible to expand $F_0(r)$ and $f(r)$ in terms of $\Phi(\lambda_n r)$. Thus take $$F_0(r) = a_0 + \sum_{n=1}^{\infty} a_n \Phi(\lambda_n r) \quad (19)$$

and $$f_r(r) = b_0 + \sum_{n=1}^{\infty} b_n \Phi(\lambda_n r) \quad (20)$$

Substitute (19) and (20) in (17) and make use of the fact that the left hand member of (17), except for the last term, may be replaced by terms of the form $$b_n \lambda_n^4 \Phi(\lambda_n r)$$

Then, collecting terms $$-\frac{m}{D}\omega^2 b_0 + b_1\left(\lambda_1^4 - \frac{m}{D}\omega^2\right)\Phi(\lambda_1 r) + b_2\left(\lambda_2^4 - \frac{m}{D}\omega^2\right)\Phi(\lambda_2 r)$$

$$+ \cdots + b_n\left(\lambda_n^4 - \frac{m}{D}\omega^2\right)\Phi(\lambda_n r)$$

$$= \frac{a_0 + a_1\Phi(\lambda_1 r) + a_2\Phi(\lambda_2 r) + \cdots + a_n\Phi(\lambda_n r)}{D} \quad (21)$$

Equating coefficients of like terms $$b_0 = -\frac{a_0}{m\omega^2}$$

$$b_1 = \frac{a_1/D}{\lambda_1^4 - \frac{m}{D}\omega^2}$$

$$b_2 = \frac{a_2/D}{\lambda_1^4 - \frac{m}{D}\omega^2} \qquad (22)$$

$$b_n = \frac{a_n/D}{\lambda_n^4 - \frac{m}{D}\omega^2}$$

Now let $F_0(r)$ be zero for all values of $r$ except $r=r_0$, where $r_0$ is the radius of the driving circle, and at $r_0$ let $F_0(r)$ be such that $$\int_0^a F_0(r) r\, dr = 1 \qquad (23)$$

Then multiplying (19) by $r\, dr$ and integrating between the limits 0 and $a$ it follows that $$a_0 = \frac{2}{a^2} \qquad (24)$$

Similarly multiplying by $\Phi(\lambda_n r)\, r\, dr$, integrating and observing that $$\int_0^a F_0(r)\Phi(\lambda_n r) r\, dr = \Phi(\lambda_n r_0)$$

it follows that $$a_n = \frac{\Phi(\lambda_n r_0)}{-a^2 \left[\frac{4}{9\lambda_n^2 a^2} + \frac{J_0(\lambda_n a) I_0(\lambda_n a)}{J_1(\lambda_n a) I_1(\lambda_n a)}\right] I_1^2(\lambda_n a)} \qquad (25)$$

Making use of (22), Equation 20 for the dynamic curve becomes $$f(r) = \frac{1}{a^2}\left[M_0 + \sum_{n=1}^{\infty} M_n \Phi(\lambda_n r)\right] \qquad (26)$$

where $$M_0 = -\frac{2}{m\omega^2} \qquad (27)$$

and $$M_n = -\frac{1}{D} \frac{\Phi(\lambda_n r_0)}{\left[\frac{4}{9\lambda_n^2 a^2} + \frac{J_0(\lambda_n a) I_0(\lambda_n a)}{J_1(\lambda_n a) I_1(\lambda_n a)}\right] I_1^2(\lambda_n a)\left(\lambda_n^4 - \frac{m}{D}\omega^2\right)} \qquad (28)$$

Inspection of (26) and (28) shows that at a resonant frequency where $$\lambda_n^4 - \frac{m}{D}\omega^2 = 0 \qquad (29)$$

the corresponding term in the expansion becomes infinite (since damping effects are neglected). In such case, except for a constant multiplier, the dynamic curve may be taken as $$f(r) = \Phi(\lambda_n r) \qquad (30)$$

At non-resonant frequencies several terms in the expansion may be necessary. Such terms will consist usually of the $M_0 a^2$ term and the $M_n$ terms for which $$\left(\lambda_n^4 - \frac{m}{D}\omega^2\right)$$

is small. As will be shown later in determining the directional characteristics the $M_0/a^2$ term is the only term which can produce pressure at points on the axis of the diaphragm or disk 19.

The resonant frequencies of a given diaphragm or disk may be determined from (29). Thus taking $\omega = 2\pi f$ $$f = \frac{1}{2\pi}\sqrt{\frac{D}{m}} \lambda_n^2$$

The value of $n$ gives the number of circles in the normal mode

Since $$D = \frac{Eh^3}{12(1-\nu^2)}$$

and $$m = \rho h$$

(31) may be written $$f = \frac{h}{2\pi}\sqrt{\frac{E}{12\rho(1-\nu)^2}} \lambda_n^2 \qquad (32)$$

showing that the frequency, for resonance in a specified mode is directly proportional to the diaphragm disk thickness $h$. For brass disks used in a physical embodiment of this invention, $E$ was taken as $(10)^{12}$, $\rho$ as 8.4 and $\nu$ as $\frac{1}{3}$. Equation 32 then gives $$f = 1.68(10)^4 \lambda_n^2 h \qquad (32a)$$

Taking $\lambda_n$ as 4.89 for the second resonant frequency, (from (11)

$$\lambda_2 = \frac{6.21}{a}$$

and $a = 1.27$ cm.), and expressing $h$ in inches, the expression for $f$ becomes $$f = 1.02 (10)^6 h'' \qquad (33)$$

Substituting Equation 11 and rearranging, Equation 32 may be written as $$h = \frac{2\pi f}{\frac{x_n^2}{a^2}\sqrt{\frac{E}{12\rho(1-\nu^2)}}}$$

where $x_n$ is a constant determined by the desired normal circular mode.

In order to analyze the directional characteristics, let it be assumed that a free-edge disk having a dynamic curve given by (26) is vibrating in an infinite baffle and that the distribution of pressure is desired at a distance from the baffle very large relative to the radius of the disk.

It has been shown by N. W. Lachlan, Oxford University Press, London, 1934, page 95, that the pressure produced at a distant point $P$ by a differential area $dA$ vibrating in an infinite baffle is $$dp = \frac{i\rho_0 \omega V_0}{2\pi} \frac{e^{-ikR_1}}{R_1} dA \qquad (34)$$

Let $dA$ be a differential area in a vibrating disk with polar coordinates $(r, \theta)$ relative to the center of the disk. Taking (26) as the equation of the dynamic curve of the disk, inserting a time factor $e^{i\omega t}$, taking the derivative with respect to time and then removing the time factor, it follows that $$V_0 = i\omega f(r).$$

$$dp = \frac{\rho_0 \omega^2}{2\pi} f(r) \frac{e^{-ikR_1}}{R_1} r\, dr\, d\theta \qquad (35)$$

In (34) $R_1$ in the denominator may be approximated as $R_0$, and $R_1$ in the exponent may be approximated as $(R_0 - r \sin \theta \cos \theta)$. Then, except for a constant multiplier $$p = \int_0^a \int_0^{2\pi} f(r) e^{ikr \sin \phi \cos \theta}\, r\, d\theta\, dr \qquad (36)$$

or, upon evaluating the first integration $$p = 2\pi \int_0^a f(r) J_0(kr \sin \phi) r\, dr \qquad (37)$$

Equations 13 and 26 show that for any fixed value of $\omega$, $f(r)$ is made up of terms of three types; a constant term, a term of the form $J_0(\lambda_n r)$ and a term of the form $I_0(\lambda_n r)$, Equation 37 may be evaluated for each of these three types and the results, with the proper multipliers, combined for the complete expression for $p$. Thus $$\int_0^a J_0(kr \sin \Phi) r dr = \frac{a^2 J_1(ka \sin \phi)}{ka \sin \phi} \quad (38)$$

$$\int_0^a J_0(\lambda_n r) J_0(kr \sin \phi) r dr =$$

$$\frac{a}{\lambda_n^2 - k_1^2 \sin^2 \phi}[\lambda_n J_1(\lambda_n a) J_0(ka \sin \phi) -$$

$$k \sin \phi J_0(\lambda_n a) J_1(ka \sin \phi)] \text{ if } ka \sin \phi \neq \lambda_n =$$

$$\frac{a^2}{2}[J_0^2(\lambda_n a) + J_1^2(\lambda_n a)] \text{ if } ka \sin \phi = \lambda_n \quad (39)$$

$$\int_0^a I_0(\lambda_n r) J_0(kr \sin \phi) r dr =$$

$$\frac{a}{\lambda_n^2 + k^2 \sin^2 \phi}[\lambda_n I_1(\lambda_n a) J_0(ka \sin \phi) +$$

$$k \sin \phi I_0(\lambda_n a) J_1(ka \sin \phi)] \quad (40)$$

The complete expression for pressure, with the exception of a constant multiplier, then becomes $$p = M_0 G + \sum_{n=1}^{\infty} M_n (P_n + Q_n) \quad (41)$$

where $$G = \frac{J_1(ka \sin \phi)}{ka \sin \phi} \quad (42)$$

$$P_n = \frac{\frac{-I_1(\lambda_n a)}{J_1(\lambda_n a)}}{\lambda_n^2 a^2 - k^2 a^2 \sin^2 \phi}[\lambda_n a J_1(\lambda_n a) J_0(ka \sin \phi) -$$

$$ka \sin \phi J_0(\lambda_n a) J_1(ka \sin \phi)] \text{ if } k \sin \phi = \lambda_n \quad (43)$$

$$= \frac{\frac{-I_1(\lambda_n a)}{J_1 \lambda_n a}}{2}[J_0^2(\lambda_n a) + J_1^2(\lambda_n a)] \text{ if } k \sin \phi = \lambda_n \quad (43a)$$

and $$Q_n = \frac{1}{\lambda_n^2 a^2 + k^2 a^2 \sin^2 \phi}[\lambda_n a I_1(\lambda_n a) J_0(ka \sin \phi) +$$

$$ka \sin \phi I_0(\lambda_n a) J_1(ka \sin \phi)] \quad (44)$$

Equations 27 and 28 may be used to find the values of $M_0$ and $M_n$ for a disk of a given material and dimensions, driven at a specified frequency, provided, of course, that the value of $\nu$ in (9) may still be taken as $\frac{1}{3}$. The dynamic curve may be obtained from (26) and the directional characteristic from (41). At or near a resonant frequency the corresponding value of $M_n$, say $M_{n'}$, will be very large relative to the other values so that the dynamic curve may be considered as given by $\Phi(\lambda_{n'} r)$ and the directional characteristic by $(P_{n'} + Q_{n'})$.

Inspection of Equations 43 and 44 shows that when $\phi = 0°$, $(P_n + 2_n) = 0$, so that, referring to Equation 41, the only term contributing to pressure on the axis is the $M_0 G$ term. At resonance this term is very small relative to the term $M_n (P_n + Q_n)$, and the pressure distribution consists of side lobes with a relatively small axial lobe. It has already been shown that a disk will vibrate at resonance with two nodal circles if the frequency is determined by (33). From the above it is apparent that at resonance the radiation is predominantly lateral.

Neglecting damping, the axial pressure is zero at resonance but the presence of damping, by reducing the amplitude of the resonant made relative to the $M_0 G$ term, always provides some pressure along the axis. As the frequency deviates from resonance the term $M_0 G$ plays a more prominent role and the axial lobe increases in magnitude until, in some cases, it is much longer than the side lobes. As the next resonant frequency is approached the axial lobe decreases and reaches a minimum at resonance. Figure 3 shows a series of directional patterns calculated for a brass disk 2.54 cm. (1.0") in diameter and 0.0845 cm. (0.032" approx.) thick mounted in an infinite baffle. The frequencies chosen are near the frequency of the two nodal circle resonance. Fig. 3C shows the distribution at the frequency corresponding most nearly to the normal mode. It can readily be seen that, near resonance, the size of the center lobe is a very critical function of the frequency, although good results are obtained when the diaphragm is excited only approximately at the determined frequency.

Uncontrolled experimental factors, such as damping, which have not been considered in the analysis could cause the experimental curve to differ considerably from the calculated curve. Variations in the assumed values of Young's modulus and the density would shift the resonant frequency.

The entire analysis has, also, been based on the assumption that only circular modes of vibration exist. The desirability of having a mode of vibration which is symmetrical about the axis gives some justification for the assumption, but it does not preclude the existence of radial modes. Near a circular normal mode, however, there should be little tendency for radial modes to appear except in the unusual circumstances in which a radial mode of vibration and a circular mode have the same frequency. If some of the noncircular modes do appear at frequencies being considered, the anlysis does not apply.

Table I of $\Phi(\lambda_n r)$ as a function of $r$, and Table II of $G$ and $(P_n + Q_n)$ as functions of $(ka \sin \phi)$ have been prepared for disks of 1.27 cm. (0.50 in.) radius made of any material for which $\nu$ may be taken as $\frac{1}{3}$ and are reproduced in this specification. They cover only the cases of one, two, and three nodal circles but may be extended further by use of Formulas 13, 42, 43 and 44. In using the tables it is necessary to know the disk thickness $h$ and the driving frequency $f$. The computed values of $M_0$ and $M_n$ and the tabulated values of $\Phi(\lambda_n r)$ may then be used in (26) to determine points on the dynamic curve. The same values of $M_0$ and $M_n$ and the tabulated values of $G$ and $(P_n + Q_n)$ may be used in (41) to determine the directional characteristic.

In using Table II it is necessary to determine the values of $\phi$. This may be done by finding $k$ from the equation $$k = 2\pi f/c = 1.825 f(10)^{-4} \quad (45)$$

*Table I.—Values of* $\Phi(\lambda_n r)$

[To be used in Eq. 27 to determine dynamic curves.]

| $r/a$ | $(\lambda_1 r)$ | $(\lambda_2 r)$ | $(\lambda_3 r)$ |
|---|---|---|---|
| 0.0 | −10.6 | +318 | −7970 |
| 0.1 | −10.38 | +228 | −6319 |
| 0.2 | −9.51 | +207 | −2358 |
| 0.3 | −8.18 | +98.7 | +1514 |
| 0.4 | −6.41 | −9.25 | +3209 |
| 0.5 | −4.27 | −87.7 | +2200 |
| 0.6 | −1.92 | −11.9 | −220 |
| 0.7 | +0.57 | −96.7 | −2028 |
| 0.8 | +3.09 | −33.6 | −1852 |
| 0.9 | +5.57 | +53.2 | −154 |
| 1.0 | +7.97 | +145 | +2910 |

*Table II.—Values of G and $(P_n+Q_n)$*

[To be used in Eq. 42 to determine directional characteristics.]

| $ka \sin \phi$ | G | $P_1+Q_1$ | $P_2+Q_2$ | $P_3+Q_3$ |
|---|---|---|---|---|
| 0.0 | 0.500 | 0.0 | 0.0 | 0.0 |
| 0.5 | 0.484 | −0.045 | −0.099 | −0.93 |
| 1.0 | 0.440 | −0.180 | −0.33 | −1.86 |
| 1.5 | 0.341 | −0.376 | −0.55 | −2.48 |
| 2.0 | 0.288 | −0.593 | −0.55 | −0.24 |
| 2.5 | 0.1988 | −0.781 | −0.11 | +3.10 |
| 3.0 | 0.113 | −0.961 | +1.05 | +9.30 |
| 3.5 | 0.039 | −1.04 | +2.81 | +16.7 |
| 4.0 | −0.0165 | −1.02 | +5.15 | +24.3 |
| 4.5 | −0.0514 | −.905 | +7.81 | +30.4 |
| 5.0 | −0.0655 | −0.738 | +11.0 | +30.4 |
| 5.5 | −0.0620 | −0.546 | +13.1 | +20.9 |
| 6.0 | −0.0461 | −0.329 | +14.4 | −0.217 |
| 6.5 | −0.0236 | −0.087 | +14.6 | −31.8 |
| 7.0 | −0.0006 | +0.144 | +14.3 | −77.4 |
| 7.5 | +0.0180 | +0.255 | +12.6 | −124 |
| 8.0 | +0.0293 | +0.293 | +9.98 | −171 |
| 8.5 | +0.0321 | +0.264 | +6.82 | −210 |
| 9.0 | +0.0272 | +0.209 | +3.48 | −243 |
| 10.0 | +0.0043 | −0.025 | −1.98 | −251 |
| 11.0 | −0.0160 | −0.158 | −3.91 | −178 |
| 12.0 | −0.0186 | −0.169 | −3.11 | −97.3 |

Then $\sin \phi$ may be found by dividing the values of $(ka \sin \phi)$ in the first column of Table II by $ka$.

It is worth noting that a given disk may be made to resonate in a specified normal mode, say with nodal circles, by determining the frequency from (32). Then (46) gives the value of $k$ and the column $(P_n+Q_n)$ in Table II gives the values of pressure to be plotted vs. the values of $\phi$ obtained as explained above. Thicker disks may be made to resonate in the same normal mode by increasing the frequency. The values of pressure are found in the same column as before but, since $k$ is increased, the values of $\phi$ corresponding to a given set of values of $(P_n+Q_n)$ are decreased. The result is a "folding" of the side lobes toward the axis.

The graphs of $(P_n+Q_n)$ vs. $(ka \sin \phi)$, shown in Figure 4 of the drawing for $n=1, 2,$ and 3 respectively, show that the functions pass through successive maximum and minimum values or peaks as $(ka \sin \phi)$ increases. If it is desired to design a disk so that, when vibrating at resonance in a baffle, it will have a given number of nodal circles and will have a directional characteristic relative to the disk with a side lobe whose maximum value is at some specified angle from the axis of the disk, it is only necessary to select a maximum or minimum point on the curve $(P_n+Q_n)$, where $n$ is taken as the number of nodal circles, and determine the corresponding value of $(ka \sin \phi)$. With $\phi$ known the value of $k$ may be found as the value of $(ka \sin \phi)$] divided by $(a \sin \phi)$. Then, from (45)

$$f = k(10)^4/1.825 \quad (46)$$

and, from (32)

$$h = \frac{2\pi f}{\lambda_n^2 \sqrt{\frac{E}{12\rho(1-\nu^2)}}} = \frac{5.96f}{\lambda_n^2 \times 10^5} \quad (47)$$

If the maximum or minimum point selected is the first such point on the curve, the corresponding side lobe will be the first lobe from the axis. If it is the second such point, the lobe will be the second from the axis and so on. If the first maximum or minimum point on the curve of $(P_n+Q_n)$ is very small relative to the second such point, the first side lobe may be negligible relative to the second side lobe. In such a case the disk may be designed to vibrate at a relatively low frequency with the first side lobe in the desired position or at a higher frequency with the second side lobe in the desired position. The directional patterns would not be identical but would be similar. It is noted that the principal maximum or minimum corresponds to the number of nodal circles involved, i. e., for $P_3+Q_3$, corresponding to three nodal circles, the principal deviation is the third loop.

To illustrate the procedure used to choose a suitable disk or diaphragm 19, assume that it is desired to design a disk 2.54 cm. in diameter which would vibrate with one nodal circle and radiate most of the sound at an arbitrary angle from the axis. Choosing 67°, for such an angle, the frequency of operation for such a disk, i. e., the driving frequency used to drive or excite the disk, is obtained from the graph of $(P_1+Q_1)$ in Fig. 4 by first finding the value of $(ka \sin \phi)$ corresponding to the first minimum, namely 3.8. Substituting the values of $\phi$ and $a$ in $(ka \sin \phi) = 3.8$ gives $k = 3.25$ or $f = 17.8 \times 10^3$ C. P. S. Substituting this value for $f$ as well as the values of $E$, $\nu$ and $\lambda$, in (32) $h = 0.19$ cm. Since this particular value of $h$ does not correspond to a standard gauge of brass, assume use of the nearest standard gauge (0.211 cm.). The calculated resonant frequency for the 0.211 cm. disk is then 19.7 kc. and the corresponding angle of maximum radiation is 56°.

The calculated pressure distribution at resonance for the 0.211 cm. disk mounted in an infinite baffle is shown in Fig. 9. The actually measured distribution pattern for the frequency which gave the minimum pressure on or near the axis is shown in Fig. 10. The actual frequency used for the measured curve is 19.2 kc. instead of 19.7 kc. When this disk is mounted in the parabolic horn, the beam obtained is sharp and the amplitude of the largest side lobe is only 0.12 times the amplitude of the main beam. The sand pattern for this disk is shown in Fig. 11.

Inasmuch as the diaphragm 19 is associated with the reflector 20, it is seen that the sharpness of the radiated beam is determined by the relative amount of radiation directed towards the side walls of the horn or reflector 20 when the vibrating disk is chosen in accordance with the above analysis. When used as a blind-aid device, sharpness of the radiated beam aids in distinguishing between objects which are close together and hence for such a purpose it is particularly desirable that a predominant part of the radiation be toward the side walls of the reflector 20. In other words, wide angle radiation with respect to the diaphragm 19 is very definitely desirable to enable discrimination between objects relatively close together.

In order to minimize back radiation from the diaphragm 19, i. e., radiation away from the desired direction of propagation which may, after reflection, interfere with radiation in the desired direction, the diaphragm 19 preferably substantially closes the opening 21 in the reflector although there should be sufficient clearance between the diaphragm and the reflector to prevent interference with free movement of the diaphragm. The end of the reflector thus substantially closed off by the diaphragm 19 may be removed as shown in Fig. 2, leaving an opening of substantially the same area as the diaphragm 19.

The reflector preferably has an opening 23 opposite the opening 21 of diameter large relative to the wave length of the frequency of the radiations in air. In order to determine the proper size of the opening 23, Equation 42 may be used in which the radius of the opening 23 of the reflector 20 is substituted for the radius of the diaphragm 19.

In order to obtain maximum sensitivity, the tube 14 should have a length of approximately one-fourth wave length with respect to the wave length of the compressional waves in the tube 14. It may be noted that the frequency of vibration is the same throughout the system but the wave length differs according to the medium through which the waves are passing. The tube 14 may be slit lengthwise in order to reduce eddy currents.

It has been found that the diameter of the tube 14 is relatively immaterial except that if the diameter of the tube is the same as the diameter of a nodal circle, it is difficult to excite the diaphragm in the desired mode. It has been found that best results are obtained if the tube is joined to the diaphragm at a point where the diaphragm remains substantially perpendicular to the adjacent tube surface at all degrees of vibration, i. e., the slope of the surface of the diaphragm at the medium is substantially zero, not only in the absence of driving force, but also during vibration at the desired frequency. This condition is met if the diameter of the tube is equal to the diameter of a median between two normal circular modes. While such a location is preferred, it has been found that if the connection between the tube 14 and the diaphragm 19 is such that the shape of the dynamic curve of the disk, i. e., the cross-sectional contour of the disk when vibrating, is not affected, the tube diameter is relatively immaterial with the one exception already noted that the tube should not have the same diameter as a nodal circle. It has been found that a soldered joint provides such a connection. Thus, if a connection is made at a median between nodal circles, no difficulty is experienced. If the tube is connected otherwise except close to a nodal circle, satisfactory operation results if the disk or diaphragm 19 is relatively thick. From the foregoing, it would appear to follow that with only one nodal circle, the connection between the tube 14 and diaphragm 19 should be made at the exact center of the diaphragm. Since it is difficult to get good mechanical support from a small tube or rod, a tube of substantial dimensions must be used for practical reasons so that with a one nodal circle mode, a relatively thick diaphragm 19 is preferably used.

In order to perform satisfactorily, the edge of the diaphragm 19 must be free to move transversely with respect to the diaphragm even though microscopically and the diaphragm is preferably flat. This condition does not prevent connection of the tube 14 at the outer edge of the diaphragm 19. The necessary condition can be met if a sufficiently thick diaphragm is employed and the connection or joint between diaphragm and tube is sufficiently flexible to permit the necesary movement of the diaphragm edge relative to the tube 14.

It has been discovered that all circular modes are not satisfactory but only normal circular modes give the desired results. In other words, the diameter of each nodal circle must bear a certain relation to the diameter if the diaphragm 19 and the necessary relation is met if the diaphragm 19 satisfies Equations 32, 41, 42, and 43. Fig. 7 gives an indication of the appearance of side lobes (undesirable in most directional beam devices) resulting from a non-normal single circle mode of which Fig. 8 is a sand pattern.

For results obtained from a one nodal circle operation, see Fig. 11, the directional pattern being similar to Fig. 5. Fig. 5, there is represented a typical directional beam obtained from a transducer utilizing a two nodal circle drive, a sand pattern of the two nodal circles being shown in Fig. 6.

While a parabolic reflector has been described and illustrated in connection with the foregoing description any reflecting means may be employed which will direct the radiation from the diaphragm 19 sufficiently parallel to and symmetrical with respect to the axis of the diaphragm to establish a radiated beam of satisfactory configuration.

Other modifications will occur to those skilled in the art. For example, referring to Equation 10, if $x_n$ be a constant equal to 3.01, 6.21, 9.37, etc. depending on the number of nodal circles and $$\frac{x_n}{a}$$

is substituted for $\lambda$, Equations 9 and 10 may be combined to give the formula $$\frac{2(1-\nu)}{x_n} = \frac{J_0(x_n)}{J_1(x_n)} + \frac{I_0(x_n)}{I_1(x_n)} \quad (48)$$

If $\nu$ be taken as $\frac{1}{3}$, $x_n$ will equal 3.01, 6.21, 9.37, etc. Formula 32 then may be written $$f = \frac{h}{2\pi}\sqrt{\frac{E}{12\rho(1-\nu^2)}}\frac{x_n^2}{a^2} \quad (49)$$

Approximate satisfaction of the equation provides satisfactory results in most, if not all, cases, because of variations in material.

Similarly Equation 32a may be written $$f = 1.68\,(10)^4 \frac{x_n^2}{a^2} h \quad (50)$$

or $$f = z_n \frac{h}{a^2} \quad (51)$$

where $z_n$ is a constant depending upon the number of nodal circles desired. Expressions 49 and 51 disclose the relationship between frequency, thickness of diaphragm and radius of diaphragm.

What we claim is:

1. In a transducer of the type having a parabolic reflector, a disk-like diaphragm arranged for vibration as a free-edge disk and located substantially at the plane of the latus rectum of said reflector, a member of magnetostrictive character connected to said diaphragm, means including said member for causing said diaphragm to vibrate, said member being connected to said diaphragm at that location of said diaphragm at which the slope remains substantially zero during vibration at said desired frequency.

2. In a transducer of the type having a parabolic reflector, a disk-like diaphragm arranged for vibration as a free-edge disk and located substantially at the plane of the latus rectum of said diaphragm, a tube of magnetostrictive character secured against motion at one portion thereof relative to said reflector and connected to said diaphragm at another portion thereof, means including said tube for causing said diaphragm to vibrate, said member being connected to said diaphragm at a location thereof which has minimum displacement during vibration at said desired frequency, the distance between said portions of said tube being of the order of one quarter wavelength in length with respect to the wavelength of the compressional wave in said tube.

3. In a transducer having a parabolic reflector, a diaphragm arranged for vibration as a free-edge disk and disposed normal to the axis of said reflector at substantially the plane of the latus rectum thereof, a cylindrical tube of magnetostrictive character connected to said diaphragm, means including said tube for causing said diaphragm to vibrate in accordance with signals to be emitted from said reflector, said diaphragm being dimensioned such that said diaphragm vibrates in a normal circular mode of at least two nodal circles, the diameter of said tube being such that said tube is connected to said diaphragm at substantially the median between two of said nodal circles.

4. In a transducer comprising parabolic reflector, the diaphragm arranged for vibration as a free-edge disk at substantially the plane of the latus rectum of said reflector, and means for driving said diaphragm at a desired frequency, the approximate dimensions of said diaphragm being chosen according to the formula $$f \cong \frac{h}{2\pi}\sqrt{\frac{E}{12\rho(1-\nu^2)}}\frac{x_n^2}{a^2}$$

in which $f$ is the frequency of vibration, $h$ is the diaphragm thickness in cm., $a$ is the radius of the diaphragm, $E$ is Young's modulus of elasticity of the diaphragm material, $\rho$ is the density of the diaphragm material, $\nu$ is Poisson's ratio for the diaphragm material and $x_n$ is a constant depending upon the number of nodal circles desired and determined as the roots of the equation $$\frac{2(1-\nu)}{x} = \frac{J_0(x)}{J_1(x)} + \frac{I_0(x)}{I_1(x)}$$

in which $J_0$, $J_1$, $I_0$, and $I_1$, are the usual notations for Bessel functions.

5. In a transducer comprising a parabolic reflector, a diaphragm arranged for vibration as a free-edge disk and located substantially at the plane of the latus rectum of said reflector, and means for driving said diaphragm at a desired frequency, the approximate dimensions of said diaphragm being chosen according to the formula $$f = z_n \frac{h}{a^2}$$

in which $f$ is the frequency of vibration, $h$ is the thickness of the diaphragm, $a$ is the radius of the diaphragm, and $z_n$ is a constant determined by the material from which the diaphragm is made and the desired normal mode of vibration of said diaphragm.

6. In a transducer comprising reflecting means, a diaphragm arranged for vibration as a free-edge disk, and means for exciting said diaphragm at a desired frequency, the approximate dimensions of said diaphragm being chosen to satisfy the equation $$h = \frac{2\pi f}{\frac{x_n^2}{a^2}\sqrt{\frac{E}{12\rho(1-\nu^2)}}}$$

in which $f$ is the frequency of vibration, $h$ is the diaphragm thickness in cm., $E$ is Young's modulus of elasticity of the diaphragm material, $\rho$ is the density of the diaphragm material, $\nu$ is Poisson's ratio for the diaphragm material, $a$ is the radius of the diaphragm, and $x_n$ is a constant depending upon the number of nodal circles desired and determined as the roots of the equation $$\frac{2(1-\nu)}{x} = \frac{J_0(x)}{J_1(x)} + \frac{I_0(x)}{I_1(x)}$$

in which $J_0$, $J_1$, $I_0$, and $I_1$, are the usual notations for Bessel functions.

7. In a transducer comprising a parabolic reflector, a diaphragm arranged for vibration as a free-edge disk at substantially the plane of the latus rectum of said reflector, and means for driving said diaphragm at a desired frequency, the approximate dimensions of said diaphragm being chosen to satisfy the formula $$h = \frac{2\pi f}{\frac{x_n^2}{a^2}\sqrt{\frac{E}{12\rho(1-\nu^2)}}}$$

where $h$ is the thickness of the diaphragm, $a$ is the radius of the diaphragm, $f$ is the frequency of vibration and is approximately equal to $k(10^4)/1.825$ ($k$ being determined from the value of $ka \sin \phi$ in which $\phi$ represents the angle of radiation corresponding to a peak of the dynamic curve of said diaphragm other than the principal peak) $E$ is Young's modulus of elasticity of the diaphragm material, $\rho$ is the density of the diaphragm material, $\nu$ is Poisson's ratio for the diaphragm material and $x_n$ is a constant depending upon the number of nodal circles desired and is determined as the roots of the equation $$\frac{2(1-\nu)}{x} = \frac{J_0(x)}{J_1(x)} + \frac{I_0(x)}{I_1(x)}$$

in which $J_0$, $J_1$, $I_0$, and $I_1$, are the usual notations for Bessel functions.

8. An article of manufacture comprising a circular diaphragm having dimensions conforming to the formula $$f \cong \frac{h}{2\pi}\sqrt{\frac{E}{12\rho(1-\nu^2)}}\frac{x_n^2}{a^2}$$

in which $f$ is the frequency of vibration, $h$ is the diaphragm thickness in cm., $a$ is the radius of the diaphragm, $E$ is Young's modulus of elasticity of the diaphragm material, $\rho$ is the density of the diaphragm material, $\nu$ is Poisson's ratio for the diaphragm material and $x_n$ is a constant depending upon the number of nodal circles desired and determined as the roots of the equation $$\frac{2(1-\nu)}{x} = \frac{J_0(x)}{J_1(x)} + \frac{I_0(x)}{I_1(x)}$$

in which $J_0$, $J_1$, $I_0$ and $I_1$, are the usual notations for Bessel functions.

9. An article of manufacture comprising a circular diaphragm having dimensions conforming to the formula $$f = z_n \frac{h}{a^2}$$

in which $f$ is the frequency of vibration, $h$ is the thickness of the diaphragm, $a$ is the radius of the diaphragm, and $z_n$ is a constant determined by the material from which the diaphragm is made and the desired normal mode of vibration of said diaphragm.

10. An article of manufacture comprising a circular diaphragm having dimensions conforming to the equation $$h = \frac{2\pi f}{\frac{x_n^2}{a^2}\sqrt{\frac{E}{12\rho(1-\nu^2)}}}$$

in which $f$ is the frequency of vibration, $h$ is the diaphragm thickness in cm., $E$ is Young's modulus of elasticity of the diaphragm material, $\rho$ is the density of the diaphragm material, $\nu$ is Poisson's ratio for the diaphragm material, $a$ is the radius of the diaphragm and $x_n$ is a constant depending upon the number of nodal circles desired and determined as the roots of the equation $$\frac{2(1-\nu)}{x} = \frac{J_0(x)}{J_1(x)} + \frac{I_0(x)}{I_1(x)}$$

in which $J_0$, $J_1$, $I_0$, and $I_1$, are the usual notations for Bessel functions.

11. An article of manufacture comprising a circular diaphragm having dimensions conforming to the formula $$h = \frac{2\pi f}{\frac{x_n^2}{a^2}\sqrt{\frac{E}{12\rho(1-\nu^2)}}}$$

where $h$ is the thickness of the diaphragm, $a$ is the radius of the diaphragm, $f$ is the frequency of vibration and is approximately equal to $k(10^4)/1.825$ ($k$ being determined from the value of $ka \sin \phi$ in which $\phi$ represents the angle of radiation corresponding to a peak of the dynamic curve of said diaphragm other than the principal peak) E is Young's modulus of elasticity of the diaphragm material, $\rho$ is the density of the diaphragm material, $\nu$ is Poisson's ratio for the diaphragm material and $x_n$ is a constant depending upon the number of nodal circles desired and is determined as the roots of the equation $$\frac{2(1-\nu)}{x} = \frac{J_0(x)}{J_1(x)} + \frac{I_0(x)}{I_1(x)}$$

in which $J_0$, $J_1$, $I_0$ and $I_1$ are the usual notations for Bessel functions.

FRANK H. SLAYMAKER.
WILLARD F. MEEKER.
LYNN L. MERRILL.

REFERENCES CITED

The following references are of record in the file of this patent:

UNITED STATES PATENTS

| Number | Name | Date |
|---|---|---|
| 1,399,877 | Pupin | Dec. 13, 1921 |
| 1,676,625 | Walker | July 10, 1928 |
| 2,063,944 | Pierce | Dec. 15, 1936 |
| 2,074,266 | Koch | Mar. 16, 1937 |
| 2,135,840 | Pfister | Nov. 8, 1938 |
| 2,216,380 | Voightlander | Oct. 1, 1940 |
| 2,403,990 | Mason | July 16, 1946 |

Certificate of Correction

Patent No. 2,541,944                                                  February 13, 1951

FRANK H. SLAYMAKER ET AL.

It is hereby certified that error appears in the printed specification of the above numbered patent requiring correction as follows:

Column 7, line 62, for "Moa²" read $M_o/a^2$; column 9, line 61, for "(Pn+2n)" read $(Pn+Qn)$;

and that the said Letters Patent should be read as corrected above, so that the same may conform to the record of the case in the Patent Office.

Signed and sealed this 11th day of September, A. D. 1951.

[SEAL]

THOMAS F. MURPHY,
*Assistant Commissioner of Patents.*